Patented Jan. 16, 1934

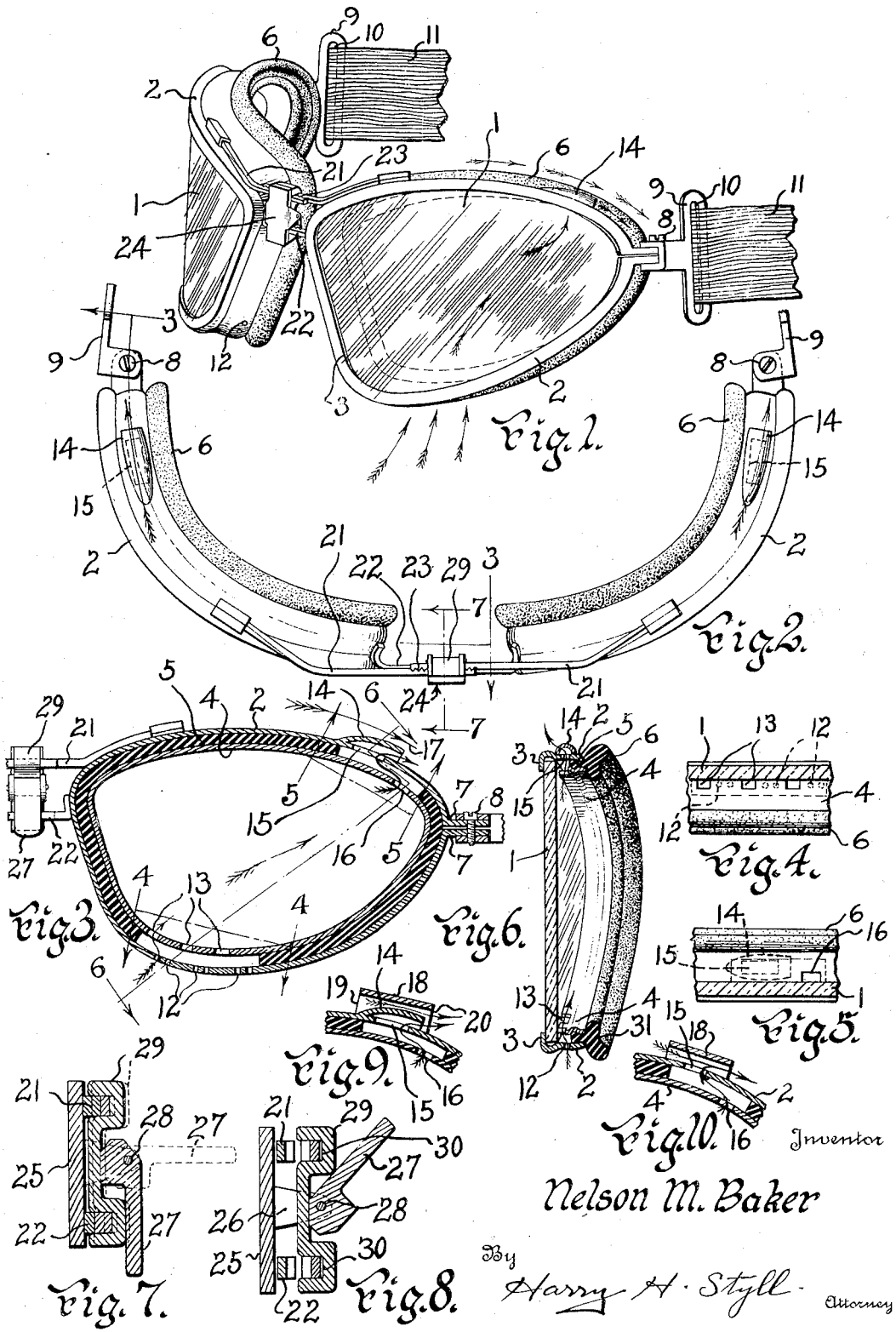

1,943,910

UNITED STATES PATENT OFFICE 1,943,910

GOGGLES

Nelson M. Baker, Southbridge, Mass., assignor to American Optical Company, Southbridge, Mass., a voluntary association of Massachusetts Application June 15, 1927. Serial No. 199,013

15 Claims. (Cl. 2—14)

This invention relates to improvements in goggles and the like and has particular reference to a goggle used for the purposes of aviation.

The principal object of the invention is to provide a properly centered pair of lenses with adjustable means for holding them rigidly in proper relation to the eyes of the wearer.

Another object of the invention is to provide a pair of wide vision lenses with means for holding them rigidly in proper relation to the eyes of the wearer.

Another object of the invention is to provide readily adjustable means that will hold the lenses rigidly in aligned position when adjusted to the facial requirements of the wearer.

Another object of the invention is to provide improved means of ventilation for the eye cups whereby the rush of air caused by the swift movement of the wearer through the air will cause air to be drawn or sucked into one side of the air cup and exhausted from the other, thus providing a continuous and changing ventilation in the air cups which will prevent steaming and fogging of the lenses, etc.

Another object of the invention is to provide improved resilient face contacting means for the eye cups together with facile means for attaching the same.

Another object of the invention is to provide improved means for regulating the distance between the lenses and for locking the same rigidly to the regulated distance.

Another object of the invention is to provide improved means for adjusting the lenses and the eye cups of the whole goggle to the facial requirements of the wearer and securing the same in such adjusted position.

Another object of the invention is to provide ductile means connecting the two lenses which may be readily bent to conform the eye cups to the facial requirements of the wearer.

Another object of the invention is to provide adjustable means on the members connecting the two lenses that may be centered with respect to the two lenses after the distance between the same has been fixed.

Other objects and advantages of the invention will become apparent from the following description taken in connection with the accompanying drawing and it will be understood that many changes may be made in the arrangements and details of parts without departing from the spirit of the invention as set forth in the accompanying claims. I, therefore, do not wish to be limited to the exact details shown and described, the preferred forms only having been shown by way of illustration.

Referring to the drawing:

Fig. 1 is a perspective side and front view of the device of the invention.

Fig. 2 is a top or plan view of the said device.

Fig. 3 is a cross section on line 3—3 of Fig. 2.

Fig. 4 is a partial section on line 4—4 of Fig. 3 looking in the direction of the arrows.

Fig. 5 is a partial section on line 5—5 of Fig. 3 looking in the direction of the arrows.

Fig. 6 is a cross section on line 6—6 of Fig. 3.

Fig. 7 is a cross section on line 7—7 of Fig. 2 looking in the direction of the arrows.

Fig. 8 is a view similar to Fig. 7 showing the jaws in open instead of closed position.

Fig. 9 is a partial section showing a modified form of ventilation from that shown in Fig. 3.

Fig. 10 is a partial cross section showing another modified form of ventilation from that shown in Fig. 3.

Up to the present time it has been customary to provide aviation and other types of protection goggles with the so-called plano or no power lenses. It has been found, however, in lenses of this type that there were distortions and refractive errors present and that to obtain the ideal conditions for the wearer's eyes the lenses should be designed with a proper center and should be held securely before the eyes of the wearer in this centered position. Lenses of this character have been recently designed by the assignee of this application and it is one of the objects of this invention to provide suitable holding means for these lenses. It has also been customary to make aviation goggles with a so-called hinged bridge or connecting member. It is clear that with a loose or hinged bridge connection the required relationship between the lenses and the eye cannot be maintained. The present invention has been designed to overcome this difficulty.

It is also well known that considerable air currents are produced by the contact of the lenses with the air due to the swift motion of the flyer through the air and this condition has been utilized in this invention to cause a suction through the eye cup which provides instant and continually changing ventilation in the eye cup to prevent sweating, steaming, fogging, etc., of the lenses.

Another objection to aviation goggles has been the limited field of vision. In the present invention the widest possible range of vision has been obtained with centered lenses which are rigidly and accurately secured in proper alignment with the eyes of the wearer.

Referring to the drawing in which similar characters of reference are used to denote corresponding parts throughout, a pair of properly centered and designed wide vision lenses 1 are mounted in an eye cup frame 2 having a front flange or lens retaining seat 3. The frame 2 is shaped in general contour to that of the orbital arch of the wearer's face. On the inside of the eye cup frame 2 and spaced therefrom is a retaining frame 4. Between the frame 2 and the retaining frame 4 is a projecting portion 5 of a resilient face contacting member 6. This face contacting member is preferably of rubber or other soft and resilient contacting substance. The resilient member 6 is held between the members 2 and 4 either by sewing through the projecting portion 5, or cementing, riveting or other means to secure it to the retaining frame 4. The projecting portion 5 is also subject to a clamping action because of the bringing together of the end pieces 7 of the frame 2 by means of the holding screw 8 which carries the head band or temple connection 9 which is pivoted on the screw 8, as clearly indicated in section in Fig. 3. The face contacting member 6 can be quickly removed by loosening the endpiece screw 8, removing the head band connection 9 and springing the frame 2 apart at the endpieces 7. The retaining frame 4 being secured to the face contacting member 6 will be removable therewith and serve to keep the face contacting member 6 in shape. Should a lens be broken it can readily be replaced by the same process of loosening the endpiece screw 8 and springing the frame 2 apart. The temple connection 9 is slotted at 10 and an elastic head band 11 is entered through the opening 10 and secured in place around the member 9 by sewing or otherwise. The elastic head band 11 may be provided with a buckle or other means for adjusting it to the head of the wearer.

The ventilation for the eye cup frame 2 is best shown in Fig. 3. At the bottom of the frame 2 are a number of perforations or openings 12 and through the inner frame member 4 are other openings 13 which are placed in staggered relation or out of line with the openings 12. The projection 5 of the resilient member 6 in the space between the frames 2 and 4 adjacent the openings 12 and 13 has been cut away to allow for the passage of air.

Fig. 4 shows the staggered relation of the openings 12 and 13 and their shape, the opening 12 being preferably circular and the opening 13 of a rectangular form. On the opposite side or at the top of the eye cup frame, best shown in Fig. 3, there is provided a tubular channel member 14 closed on the nose side of the cup but opened on the outer end. Under this tube or hood 14 is an opening 15 in the frame member 2 and in staggered relation thereto an opening 16 in the inner frame 4. The projection 5 of the resilient member 6 has been cut away between the members 2 and 4 adjacent the openings 15 and 16. It will be apparent that the air rushing over the end of the opening of the member 14, as indicated by the arrow 17, will cause a suction at the open end of the tubular member 14 tending to exhaust the air from inside of the eye cup frame 2, which in turn tends to suck the air in through the openings 12 and 13 thus causing a constant ventilation through the eye cup from the openings 12 out through the opening 15, which will prevent fogging and steaming of the lenses.

In Fig. 9 there is shown a modification of the ventilation wherein a hood 18 has been placed over the tubular member 14, this hood being open at both ends 19 and 20. The open end 19 tends to catch the air and force it across the open end of the tubular member 14 in a more concentrated way than without the member 18.

In Fig. 10 a modification is shown of the ventilation wherein the tubular member 14 has been omitted, the hood 18 open at both ends taking its place.

The eye cup frames 2 are connected with each other by two ductile bridging or spacing members 21 and 22, respectively, 21 being the upper connection, and 22 the lower connection. Both the connecting members 21 and 22 are divided and overlap each other, being provided in the way of their overlapping portions with the teeth 23 which inter-engage each other. The ends of these members opposite their overlapping portions are soldered or otherwise secured to the eye cup frame 2. These members are ductile so that they may be bent by the exertion of pressure, but they are rigid enough to maintain the two eye cup frames in adjusted position from which they are not readily deflected.

Interengaging with the bridge members 21 and 22 is a clamping member 24. This clamping member 24 comprises a supporting plate 25 having the projecting ears 26 to which is pivoted a lever 27 at the pivot 28. The lever 27 is a cam lever, as shown in Fig. 8. Overlying the supporting plate 25 and spaced therefrom is the clamp plate 29 having recesses 30 to receive the bridging members 21 and 22, as the case may be. The clamping member 29 lies between the plate 25 and the cam lever 27. It will be clear that when the cam lever 27 is pushed down in the position shown in Fig. 7 the clamp plate 29 is forced down tightly over the bridging members 21 and 22 locking them securely in place by means of their interengaging teeth 23. When the lever 27 is pushed up as shown in Fig. 8 the teeth of the overlapping portions of the bridging members 21 and 22 may be withdrawn from engagement and the members 21 and 22 may be slid along to change the distance between the eye cup frames.

When the lever 27 is in an intermediate position between the closed or clamping one and the open or sliding one, the clamping member 24 as a whole may be slid on the bridging members 21 and 22 to position the clamping member 24 midway between the eye cups 2. It will be clear that the clamping member 24 provides for three distinct operations; one, to lock the bridging members 21 and 22 rigidly in clamped position; second, to allow the bridging members 21 and 22 to be slid along to lengthen or shorten the distance between the two eye cup frames 2; and third, after the proper adjustment between the eye cup frames has been made to position the clamp member 24 as a whole midway between the two eye cup frames.

It will also be clear that as the members 21 and 22 are ductile, these members may be bent or adjusted by bending to more securely and snugly fit the eye cup frames 2 to the facial requirements of the wearer thus providing means of adjustment that will position the two lenses in their required relationship to the eyes of the wearer and hold them securely in this position. The resilient face contact member 6 is provided with a vacuum groove 31 to adapt it to snugly secure and adjust itself to the parts of the face with which it contacts. These resilient members thus are preferably made of molded or pressed soft rubber.

It will be noted, Fig. 1, that the upper bridging member 21 in the left hand eye cup as shown in the drawing has the overlapping portion on the outer side, that is, the side away from the eye of the wearer, whereas the lower bridging member 22 for the left hand eye cup as shown in the drawing has the overlapping portion on the side towards the eye of the wearer. In other words, the bridging portions of one eye cup have one bridging member on the outside and the other on the inside of the overlapping connection.

From the foregoing description it will be seen that I have provided simple, efficient and inexpensive means for carrying out all the objects of the invention and that I have provided ready and facile means of adjusting such a goggle to the facial requirements of the wearer and then locking the parts in such a way as to make them rigidly maintain the said relationship.

Having described my invention, I claim:

1. In a device of the character described, an outer eye cup frame adapted to hold a lens and having an intake opening on one side thereof and an outlet opening on the opposite side thereof, an inner eye cup frame spaced from and substantially parallel to the outer eye cup frame and having an intake opening on one side thereof and an outlet opening on the opposite side thereof in offset relation to the openings of the outer eye cup frame, a rubber face contacting member having a portion held between the outer and inner eye cup frames, said portion of the rubber between the frames being cut away adjacent the intake and outlet openings to allow the passage of air therethrough.

2. In a device of the character described, an outer eye cup frame adapted to hold a lens, an inner eye cup frame spaced from and substantially parallel with the outer eye cup frame, a resilient face contacting member having a portion extending between the inner and outer eye cup frames and having a channeled face engaging portion adapted to form a vacuum connection for the face engagement, and means for holding the inner and outer eye cup frames together with a portion of the resilient member between them.

3. In a device of the character described, an outer eyecup frame adapted to hold a lens, and having offset terminal ends abutting one on the other, a member holding the offset ends together, an inner eyecup frame spaced from and substantially parallel to the outer eyecup member, a resilient face contacting member having a portion extending between the inner and outer eyecup frames, said means for uniting the offset ends of the outer eyecup being operative against the compression of the resilient means between the two eyecup frames to hold the resilient means there between, and the two endpieces together.

4. In a device of the character described, an outer eyecup frame adapted to hold a lens and having an intake opening on one side thereof, and an outlet opening on the opposite side thereof, an inner eyecup frame spaced from and substantially parallel to the outer eyecup frame, and having an intake opening on one side thereof, and an outlet opening on the opposite side thereof, in offset relation to the openings of the outer eyecup frame, a rubber face contacting member having a portion held between the outer and inner eyecup frames, said portion of the rubber between the frame being cut away adjacent an opening to allow the passage of air there through.

5. In a device of the character described, an eyecup frame adapted to hold a lens and a resilient face contacting member having a projecting ridge portion secured by the frame, said face contacting member extending on each side of the frame substantially normal thereto, the face contacting edge being tapered from the outer edge towards the inner and adapted to form a vacuum connection for face engagement.

6. In a device of the character described, an eyecup frame adapted to hold a lens, a resilient face contacting member secured by the frame, said face contacting member having a channeled edge adapted to form a vacuum connection for face engagement and clamping means on the frame adapted to be operated to retain and disengage the face contacting member.

7. In a device of the character described, an eyecup frame adapted to hold a lens and having an intake opening and an outlet opening and a hood member over one of the openings having one end sealed and the other end open, the longitudinal axis of which is substantially parallel with the plane of the lens and so positioned that the open end will be in a rearward direction when the eyecup frame is on the face of the wearer.

8. In a device of the character described, an eyecup frame adapted to hold a lens and having an intake opening on one side thereof and an outlet opening on the opposite side thereof, a hood member over one of said openings having one end open, the longitudinal axis of which is substantially parallel with the plane of the lens and so positioned that an open end will be in a rearward direction when the eyecup frame is on the face of the wearer, and a face contacting member on the eyecup frame having a portion cut away adjacent the intake and outlet opening whereby passage of air over the hood member will cause suction to draw air through the openings to ventilate the eyecup.

9. An interchangeable face contacting member for use in combination with a goggle eyecup having means to receive it comprising a rim shaped to fit within the goggle eyecup and a resilient member having a face engaging portion and a rib on the opposite side thereof, said rib being secured to said rim and said face engaging portion extending beyond said rim.

10. In a device of the character described, an eyecup having means for holding a lens and having a vent and a hood over the vent having a solid unpierced wall and a channel therethrough open at both ends, the axis of said channel being substantially parallel with the plane of the lens holding means for the length of the channel and said vent communicating with said channel between its ends, the axes of the vent and channel being at an angle to each other and the vent opening being so arranged that air will be drawn through it from the interior of the eyecup by a current of air through the channel from an end thereof in either direction.

11. In a device of the character described, an eyecup having lens holding means and having a vent and a hood over the vent having a solid unpierced wall and a channel therethrough open at both ends, the axis of said channel being substantially parallel with the lens holding means for the length of the channel and said vent communicating with said channel between its ends, the axis of the vent being substantially normal to the axis of the channel and the vent opening being so arranged that air will be drawn through it from the interior of the eyecup by a current of air through the channel from the end thereof in either direction.

12. In a device of the character described, an outer eyecup frame having its inner end shaped substantially to a face contacting contour and adapted to hold a lens and having offset terminal ends abutting one on the other, a member holding the offset ends together, an inner eyecup frame having its inner end shaped substantially to the same contour as the inner end of the outer eyecup member and secured within the outer eyecup member and separable therefrom without deformation of parts, a resilient face contacting member having a portion shaped to the contour of the face and having a portion secured to the inner eyecup frame, said means for uniting the offset ends of the outer eyecup being operative against the resiliency of the outer eyecup member tending to separate the offset ends, said inner ends of the eyecup members and the secured portion of the face contacting member overlying each other.

13. In a device of the character described, an outer eyecup frame having its inner end shaped to substantially a face contacting contour and adapted to hold a lens, and having offset terminal ends abutting one on the other, an inner eyecup frame having its inner end shaped substantially to a face contacting contour, a resilient face contacting member having its contacting portion shaped substantially to a face contacting contour and having a portion secured to the inner eyecup frame and separable means for holding the offset ends together to secure the inner eyecup frame within the outer eyecup frame so that they may be separated without deformation of parts, said inner ends of the two eyecups and the secured portion of the face contacting member overlying each other.

14. In a device of the character described, an outer eyecup frame having its inner end shaped substantially to a face contacting contour and adapted to hold a lens and having offset terminal ends abutting one on the other, an inner eyecup frame having its inner end shaped substantially to a face contacting contour, a resilient face contacting member having a portion shaped to fit the orbital rim of the eye and having a portion secured to the inner eyecup frame and separable means for holding the offset ends together to secure the inner eyecup frame within the outer eyecup frame so that they may be separated without deformation of parts, said inner ends of the eyecup frames and the portion of the face contacting member secured to the inner frame overlying each other.

15. In a device of the character described, an outer eyecup frame having its inner rim shaped substantially to a face contacting contour and adapted to hold a lens said frame being divided, means for holding the ends of the divided frame together, an inner eyecup frame having its inner rim shaped substantially to the same contour as the inner rim of the outer eyecup member and secured with the outer eyecup member and separable therefrom without deformation of the parts, a resilient face contacting member having a portion shaped to the contour of the face and having a portion secured to one of the eyecup frames, said means for uniting the ends of the divided outer eyecup being operative against the resiliency of the outer eyecup member tending to separate the ends, said inner ends of the eyecup members and the secured portion of the face contacting member overlying each other.

NELSON M. BAKER.